United States Patent Office 2,935,997
Patented May 10, 1960

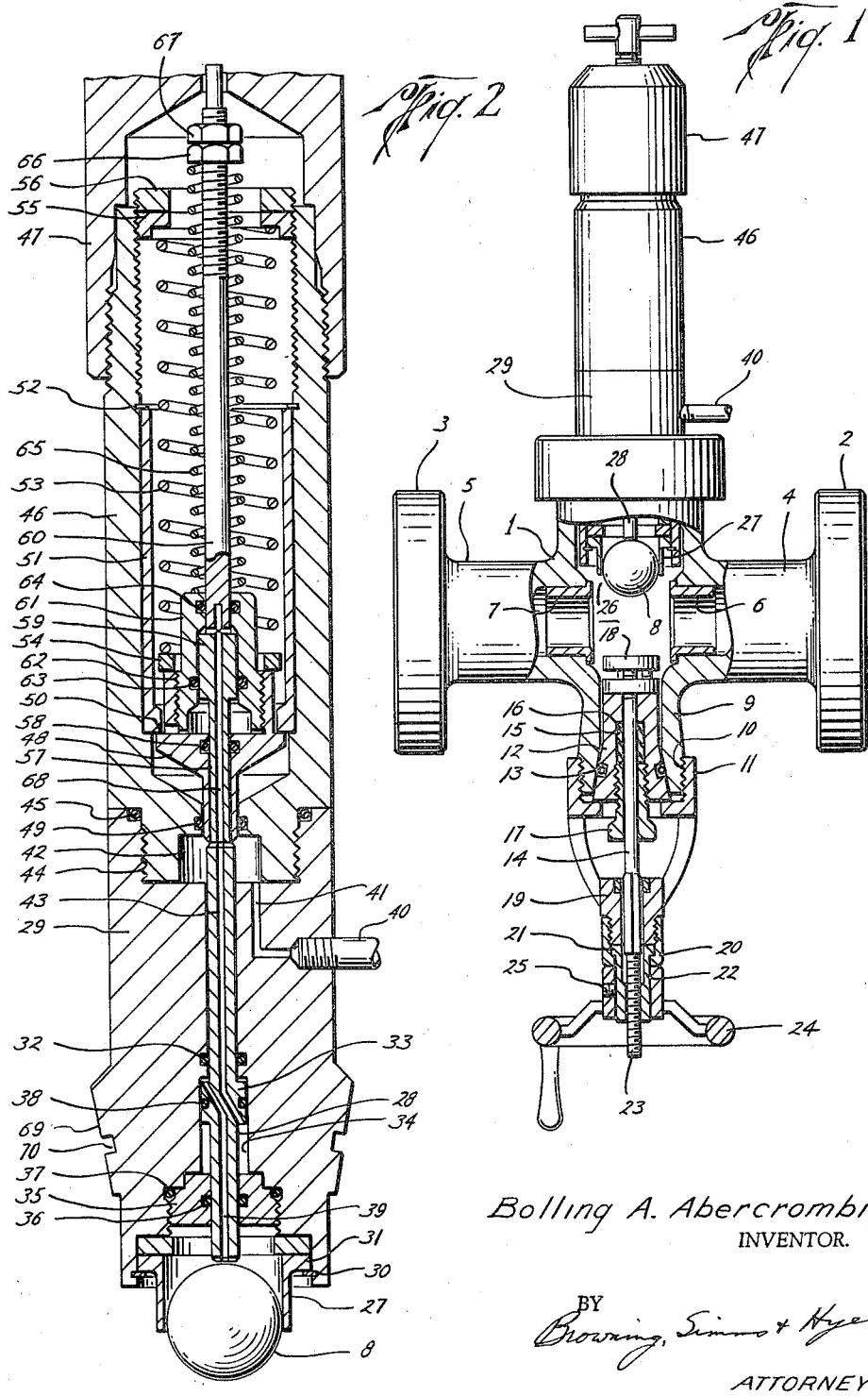

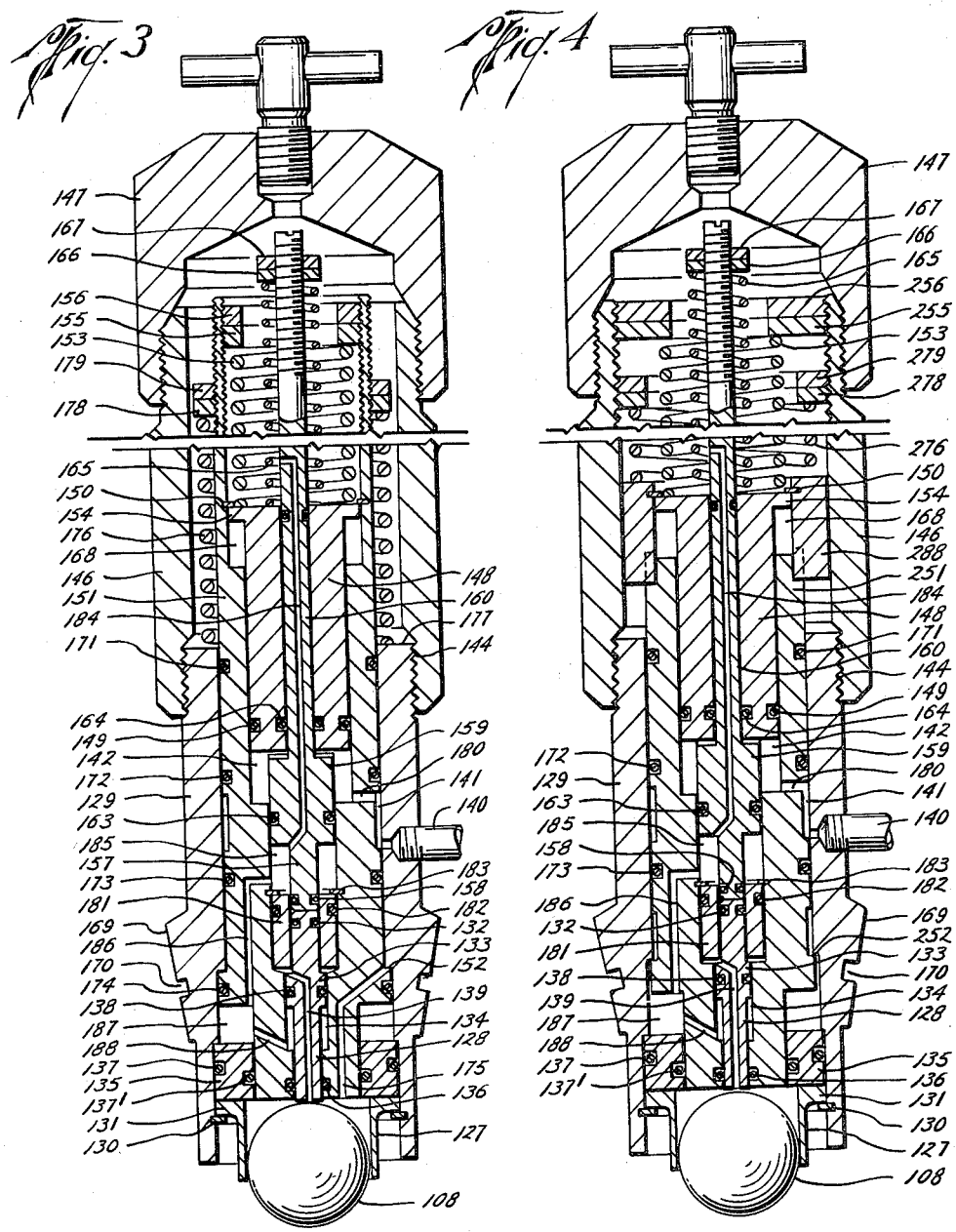

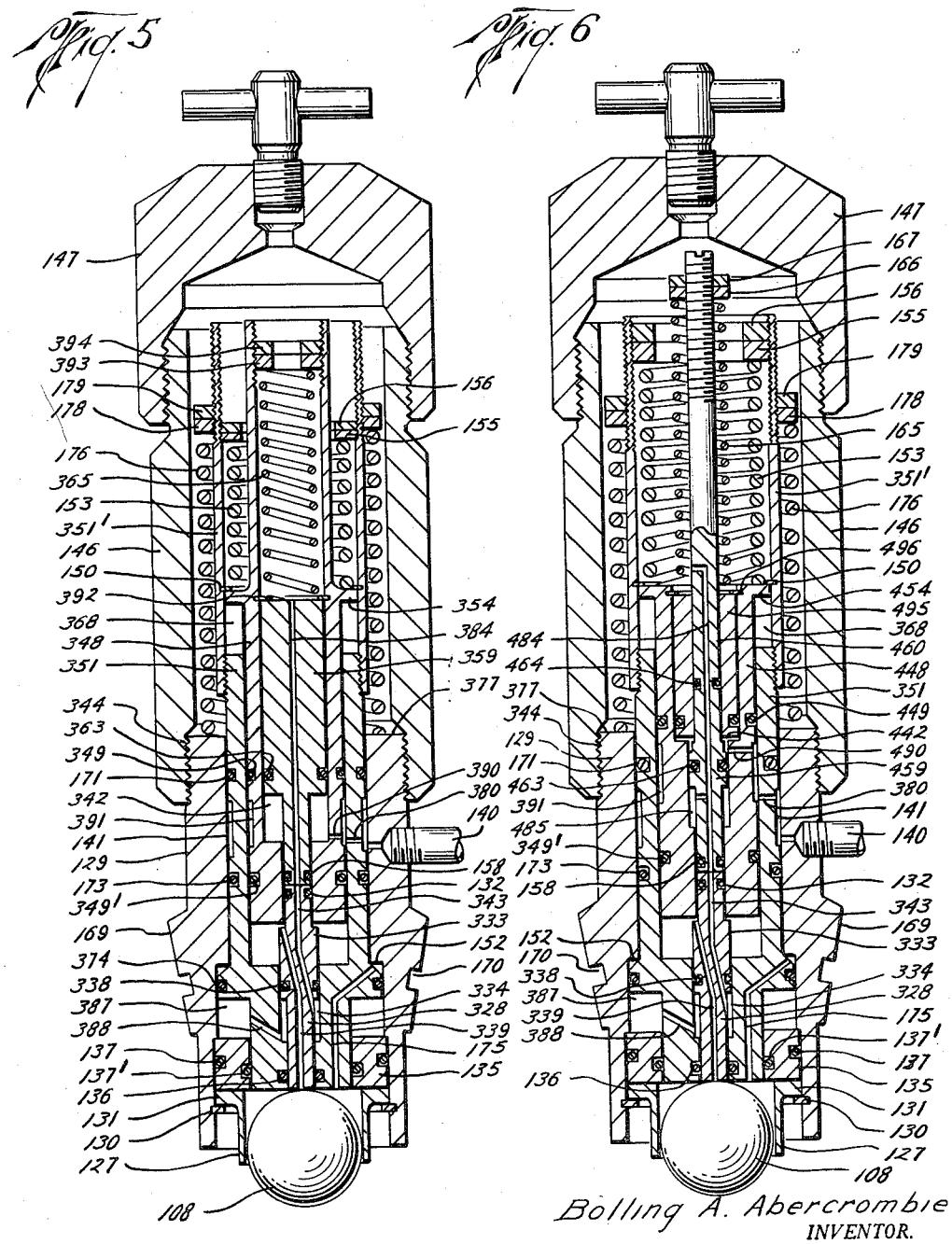

2,935,997

AUTOMATIC SHUT-OFF VALVE AND CONTROLS THEREFOR

Bolling A. Abercrombie, Houston, Tex., assignor to U.S. Industries, Inc.

Application June 17, 1957, Serial No. 665,920

17 Claims. (Cl. 137—458)

This invention relates to automatic valves adapted to be connected into a flow line and automatically operable by pressures originating externally of said flow line or both externally and internally thereof when such pressures vary beyond predetermined high and/or low limits, to shut off flow through the line.

Automatic shutoff valves of the type operable by pressures originating externally of the valve when the same either exceed predetermined high and/or fall below predetermined low limits to shut off flow through the line have heretofore been known but such valves have required the use of a complex plunger arrangement employing two plungers connected together by an eccentric mechanical linkage located within an off-center chamber as compared with the axis of the two plungers, one of such plungers being exposed at one end to the pressure within the valve body and having provision for balancing said pressure on its opposite end, and the other of said plungers being exposed to the external control pressure on both of its ends so as to balance it with regard to such pressure. The control resulting from variations in the external pressure is provided by external fluid pressure motor means such as pistons engageable with the complex plunger arrangement above described and movable in one direction to urge toward the valve body the plunger which is exposed to the interior thereof, such piston means being exposed to the external control pressure to move it in one direction and to a permanent bias such as a spring or the like constantly urging it in the opposite direction.

Such a valve arrangement as just mentioned has had the major objection of being difficult and expensive to manufacture because of the eccentric nature of the connection between the two plungers and the consequent eccentric nature of the housing necessary to be provided therefor, and also because of the plurality of parts required.

It is an object of this invention to provide such a valve with a concentric plunger arrangement for transmitting the actuating force from the outside control means to the interior of the valve body.

It is a further object of this invention to provide a single integrated concentric transmission plunger for transmitting the actuating force from the outside control means to the interior of the valve body.

It is a still further object of this invention to provide a single integral concentric transmission plunger for transmitting the actuating force from each of a plurality of control means, one of which is controlled from the exterior of the valve body, to the interior of the valve body.

Another phase of this invention has for its object the provision of a control means for such a valve which will close under the influence of either of two control pressures, one of which may be the pressure in the body, so that the valve will close when one of the control pressures either exceeds or falls below a predetermined permissible range, or when the other control pressure falls below a predetermined minimum.

Another object is to provide a control means which will close such a valve under the influence of two control pressures, one of which may be the pressure in the body, so that the valve will close when one of the control pressures either exceeds or falls below a predetermined permissible range, or when the other control pressure rises above a predetermined maximum.

Another object of this invention is to provide structures in which each of the last two objects may be accomplished with the first mentioned control pressure being the pressure within the valve body, and also structures in which the last two objects may be accomplished with the first mentioned control pressure being one originating outside the body.

Other objects and advantages of this invention will become apparent from the following description taken in connection with the accompanying drawings in which are set forth by way of illustration and example certain embodiments of the invention.

In the drawings:

Fig. 1 shows a valve of the character to which this invention relates with the more conventional interior of the valve proper shown in longitudinal cross-section and the control mechanism shown in side elevation.

Fig. 2 is a longitudinal cross-section through a control mechanism constructed in accordance with this invention and particularly illustrating the concentric transmitting plunger arrangement for transmitting the closing action of the control mechanism to the interior of the valve, together with one form of control mechanism arranged to cause the closing of the valve when a control pressure originating exteriorly of the valve body falls below or exceeds a predetermined pressure range.

Fig. 3 is a view similar to Fig. 2 but illustrating a modified form of control mechanism having the control characteristics of the modification shown in Fig. 2 and in addition thereto providing for the closure of the valve when the pressure within the valve body exceeds a predetermined maximum pressure.

Fig. 4 is a view similar to Figs. 2 and 3 but illustrating a still further modification which again has the characteristics of the modification shown in Fig. 2 but in addition thereto provides for the closing of the valve when the pressure within the valve body falls to less than a predetermined minimum.

Fig. 5 illustrates a still further modified form of control mechanism in a view similar to Figs. 2, 3 and 4, but in which the closing of the valve will result when the pressure within the valve body either exceeds or falls below a predetermined pressure range, or when the external source of pressure falls below a predetermined value.

Fig. 6 is a view similar to Figs. 2 to 5 inclusive showing a control mechanism embodying this invention and having operative characteristics similar to those of the control mechanism shown in Fig. 5 except that it will operate to cause the valve to close when the control pressure from an exterenal source increases beyond a predetermined maximum.

For the sake of convenience, "non-actuating forces" will be used to designate those forces exerted on movable parts but always balanced by other forces so that they produce no movement, and "actuating forces" will be used to designate resultant forces which are at times unbalanced and cause movement.

Referring now in more detail to the drawings, there is shown in Fig. 1 a valve of the general type to which this invention relates, this valve having a body 1 provided with suitable end connections such as the flanges 2 and 3 adapted for connecting the body to the ends of a flow line which is to be controlled by this valve. The connections 2 and 3 are on ports 4 and 5 either of which in the present instance may be positioned to be an inlet flow port and either of which may be an outlet flow port. Positioned at the inner end of each port is a valve seat element with the seat facing inwardly toward the hollow central portion of the valve body, these seat members being designated by the numerals 6 and 7, respectively. They are so formed as to provide seats for the ball valve member 8 and to receive such member and close the valve when the ball valve member is carried against whichever one of the seat members 6 or 7 is positioned in the outlet of the valve.

Normally when the valve is open as illustrated, the valve member 8 is adapted to be held in position shown by means presently to be described. On the opposite side of the flow passage which extends between the inlet and outlet ports the valve body is provided with a lateral extension 9 having an externally threaded outer end 10 adapted to receive a nut 11 for holding in place a closure member 12. The closure member 12 is sealed within the extension 9 by means of an O-ring 13 or other suitable sealing member, and the closure 12 also has an opening therethrough to provide passage for a stem 14, the packing for sealing about this stem within said opening being shown at 15 within a counterbore 16 and being compressed by means of a gland nut 17. Thus, the extension 9 will be completely closed in use but will provide for the passage therethrough of the stem 14 while forming a seal about the stem.

The stem 14 on the end thereof within the body 1 carries a pusher member 18 in the form of a reset knob or disc, which is adapted for pushing the ball valve member 8 from sealing position against the seat member 6 or the seat member 7 into the position illustrated in Fig. 1 thereby opening the valve after it has been closed.

For the purpose of manipulating the stem 14 to open the valve in the manner just described, the nut 11 is provided with a yoke carrying a bearing 19 threaded at one end to receive a retaining nut 20 which engages a flange 21 on an operating nut 22 so as to hold the operating nut against endwise movement while permitting it to rotate. This operating nut is threadedly engaged with the threaded portion 23 on the stem 14 so that rotation of the operating nut 22 causes the stem 14 to move in an endwise direction provided it is kept from rotating during the rotation of the nut 22. This last objective is accomplished by making the stem 14 non-circular in cross-section where it passes through the bearing 19 and making the bearing 19 of a corresponding cross-sectional shape through its interior.

The nut 22 may be rotated in any suitable manner as by means of a hand wheel 24 secured to the exterior of the nut by means such as the set screw 25.

Referring now to the valve closure member 8, it will be seen that in Fig. 1 it is yieldably retained in its inactive position in a space 26 laterally disposed with respect to the direct line of flow through the valve body and out of such line of flow by means of a spring retainer means having gripping fingers 27, gripping the valve member 8. It will be retained in this laterally disposed space 26 until forced therefrom by means such as a plunger 28.

The plunger 28 is mounted so as to reciprocate toward and away from the valve member 8 and when forced toward the valve member 8 to force this valve member out of its resilient retaining means 27 and permit it to move out of the laterally disposed space 26 into the path of flow through the valve body. Thereupon it will be carried by such flow against that one of the valve seat members 6 or 7 which is downstream or surrounding the outlet port, and thereby result in closure of the valve.

The opposite end of the plunger 28 is adapted to be acted upon by a control mechanism disposed within an extension of the valve body such as the adaptor 29 to which may be connected either integrally or separably the remainder of the control mechanism as presently described.

Referring now more particularly to Fig. 2, it will be seen that the retaining means 27 is adapted to be retained in place within the adaptor body 29 by means of a split-ring retaining member 30 which is in engagement with a flange 31 on the yieldable retaining means 27.

In this form illustrated in Fig. 2 the actuating plunger 28 extends up through a central bore in the adaptor body 29, a seal in the form of an O-ring or the like 32 being provided about this plunger between it and the body 29. Below the seal 32, which is illustrated as being in the body 29 in a groove therein but which might be mounted in a groove in the outer surface of the plunger 28 if so desired, the plunger is provided with an enlargement which forms a piston 33. This piston 33 is located within a counterbore 34 in the body 29 and both are concentric with the remainder of the plunger 28 and with the remainder of the bore through the body 29. Therefore any fluid pressure applied to any endwise facing surface of this plunger will be balanced about the axis of the plunger so as not to tend to tilt it. The piston portion 33 is of such lateral dimension as to provide upwardly and downwardly facing shoulders on the plunger 28 which have an area substantially identical with that of the ends of the plunger 28. Those portions of the plunger 28 above and below the piston member 33 are substantially the same cross-sectional area and the lower portion passes through a closure plug 35 which carries a sealing member 36 therein provide a sliding seal about the plunger 28. The plug 35 is sealed to the body 29 by means of a second seal 37 so that it serves to close the lower end of the counterbore 34 and the counterbore 34 provides a cylinder within which the piston 33 may reciprocate as the plunger 28 reciprocates. The plunger 28 is, however, sealed with a sliding seal against the walls of the bore 34 by means of a seal ring 38 or the like.

With the arrangement as thus far described, it will be appreciated that the lower end of the plunger 28 will at all times be subjected to the pressure of fluid existing within the body of the valve and that this pressure will tend to urge it upwardly as seen in Fig. 2. However, the plunger is provided with a passageway 39 extending centrally thereof from its lower end upwardly to a position within the piston 33 and opening into the space above the shoulder at the upper end of such piston. Inasmuch as the upper shoulder area provided by such piston is substantially equal to the area of the end of the plunger 28 and is an oppositely facing surface as related to the surface on the lower end of the plunger, and pressure fluid from within the valve may pass upwardly through the bore 39 into the space above the piston 33, the result will be that the pressure from within the valve body will be equalized on the plunger 28 and will not tend to move it either upwardly or downwardly. In this construction this is accomplished without utilizing the upper end of the plunger 28.

Toward its upper end of the adaptor body 29 is formed to receive a conduit 40 for the purpose of conveying into the adaptor body 29 an external control pressure whose variation it is desired to utilize for the purpose of determining the closing of the valves. This conduit 40 connects with a passageway 41 in the adaptor body 29 and communicates with a space 42 surrounding the upper end of the plunger 28. The upper end of plunger 28 provides a second surface facing oppositely to the lower end of the plunger and may be termed a second oppositely facing surface. Extending from the upper end of the plunger 28 and centrally down through the plunger to the interior of the piston 33 is still another passageway 43 which opens through the piston 33 into the space below the shoulder forming the lower end of such piston. Inasmuch as the area of this shoulder, which constitutes a fourth surface on the plunger facing in the same direction as the first-mentioned end thereof, is substantially identical with the area of the upper end of the plunger 28, the effect of the control pressure entering through the conduit 40 into the space 42 will be balanced on the plunger 28 and will not directly tend to urge it in either direction. The force exerted by such pressure on the upper end of the plunger 28 being thus balanced, may be termed a non-actuating force.

The upper end of the adaptor body 29 is provided with a recess therein which is interiorly threaded at 44, and with a groove at its upper end to receive a sealing ring 45 of any suitable form. Threaded into the threaded upper end 44 of the adaptor 29 is the control mechanism body 46 which provides the upper and lateral limits of the chamber 42. The upper end of this control mechanism body is illustrated as being closed by means of a cap or cover 47 threaded into place thereon. However, in this particular mechanism it is unnecessary that the cap 47 be sealed with respect to the body 46 because the interior of the body 46 in ordinary operation is under atmospheric pressure.

Located within the lower portion of the interior of the body 46 is a low pressure piston 48 having a reduced extension on its lower end passing through a seal 49 in the reduced bore communicating with the space 42. Thus, this piston 48 will reciprocate and when moved downwardly will serve to force the plunger 28 downwardly and displace the valve member 8 from its resilient retainer 27. The force thus exerted by piston 48 on the upper end of plunger 28 will be equally applied about the axis of piston 28 and will thus be balanced about such axis. It constitutes an actuating force.

The low pressure piston 48 is restricted against upward movement by a shoulder 50 provided at the lower end of a liner member 51 retained within the body 46 by means of spring retainer ring 52 or the like. The low pressure piston 48 is biased in a downward direction by means of a spring 53 which bears against a bearing ring 54 on the upper end of the piston. The upper end of this spring abuts against an abutment adjusting nut 55 which is locked in place in threaded position within the housing 46 by means of a lock nut 56. It may be adjusted within the housing 46 to provide the desired tension on the spring 53 and hence the desired actuating force acting downwardly through the piston 48 on the plunger 28.

The low pressure piston 48 is provided with a bore therethrough in which is reciprocably mounted the reduced lower end 57 of a high pressure piston, this lower end being provided with a reciprocating seal within the low pressure piston 48 as shown at 58. The high pressure piston 59 on the upper end of this stem 57 has an upward extension 60 therefrom and is mounted for reciprocation within a cylinder formed in the retaining nut and housing 61. This high pressure cylinder is threaded at 62 into the upper extension of the low pressure piston 48 so as to be retained thereby and is provided with suitable seal ring 63 for providing a seal around the exterior of the piston 59. A second seal is provided around the upper extension 60 of the piston 59 as shown at 64.

The high pressure piston 59 is biased toward an upper position by means of a spring 65 bearing at its upper end against the nut 66 threaded on the upper end of the extension 60 and locked in place by means of a lock nut 67. The lower end of the spring 65 bears against the high pressure cylinder member 61. Obviously, the compression of the spring 65 may be adjusted by adjustment of the nut 66 so as to place whatever desired bias may be necessary upon the high pressure piston 59. It is noted, however, that the bias in this piston is in the opposite direction from that on the low pressure piston 48 and tends to hold it away from the plunger 28.

The high pressure piston has a bore therethrough communicating between its lower end surface and the space within the high pressure cylinder just above the piston 59 as illustrated at 68. Thereby pressure fluid from within the space 42 may pass upwardly through this bore 68 and into the space above the high pressure piston 59 so as to urge it downwardly against the tension or bias of the spring 65. It is noted that the same pressure within the space 42 will act upon the lower end of the lower extension of the low pressure piston 48 tending to urge it upwardly against the bias of the spring 53.

When a control pressure is admitted to the space 42 through the conduit 40 and the passageway 41, it will thus act on the lower end of the low pressure piston 48 tending to hold it away from contact with the plunger 28, and at the same time it will act on the upper end of the high pressure piston 59 and tend to force it toward contact with the plunger 28. If this pressure is within the range determined by the adjustments of the springs 53 and 65 so that it is sufficient to hold the low pressure piston 48 in its upper position as shown against the compression of the spring 53, and yet insufficient to force the high pressure piston 59 downwardly against the compression of the spring 65, there will be no effective actuating force exerted on plunger 28, the plunger 28 will not be forced downwardly and the valve member 8 will be retained by the retaining means 27. However, if the control pressure within the space 42 drops to an amount insufficient to act upon the lower end of the low pressure piston 48 with a sufficient force to overcome the force of the spring 53, then this spring 53 will force the low pressure piston downwardly and cause it to exert an actuating force on the upper end of and thereby move the plunger 28 downwardly and dislodge the valve member 8 from its retaining means 27. When this occurs the valve member will move into the path of flow through the valve body and be carried into closed position against one of the valve seat members 6 or 7.

On the other hand, if the pressure within the space 42 should rise to such a degree that it acts upon the high pressure piston 59 with a force sufficient to overcome the force of the spring 65, it will move the high pressure piston downwardly and cause it to exert an actuating force on the upper end of and thereby act upon the plunger 28 in similar fashion so as to cause it to dislodge the valve member 8 and close the valve.

The mechanical actuating forces exerted by pistons 48 and 59 on the plunger 28, being evenly distributed about the axis of plunger 28 and parallel thereto, will not tend to tilt plunger 28 and may be said to be balanced about its axis.

The adaptor member 29 is provided with a tapered seat portion 69 on its outer surface adjacent its lower end, the same being adapted to be seated within a similar portion formed in the valve body and sealed therein by means of a seatable seal ring within a groove 70. Any suitable holding means such as a retaining nut illustrated may be employed for holding the adaptor member 29 in position within the body of the valve.

Referring now to Fig. 3, there is illustrated a modification of this invention which differs from the form illustrated in Fig. 2 in that it provides not only for the control of the closing of the valve by an actuating force whose application and intensity is determined through a control pressure originating exteriorly of the valve body, but also for exertion of such an actuating force causing the valve to close upon a rise of the pressure within the valve body to a value greater than some predetermined value.

In describing this form of the invention, when reference is made to parts which correspond closely to parts already described in connection with Fig. 2, they will be referred to by the same numerals as used for those parts in Fig. 2 but with the additional digit "1" prefixed thereto. Thus, the resilient retaining means 27 is described in connection with Fig. 2 and the corresponding means in Fig. 3 is designated with the numeral 127.

As in the previously described form of the invention, the ball valve member 108 is retained by the retainer 127 which in turn is held in place within the body 129 by means of a split retainer ring 130 bearing against the flange 131 on the upper end of the retaining means 127.

In like fashion as the plunger 28, the plunger 128 has a seal 132 about its upper end portion and an intermediate enlarged portion 133 providing a piston which in turn is located in a cylinder 134 formed in a plunger which will presently be described.

The cylinder head 135 is held in place by the retaining means 127 and is provided with a stop preventing its upward movement beyond its desired position by means of a shoulder in the body 129.

The lower end portion of the plunger 128 passes through a bore in the same piston member as that in which the cylinder 134 is formed and is provided with a sliding seal within this bore by means of a seal ring 136.

The cylinder head 135 is provided with a seal against the body 129 by means of a seal ring 137 and with a seal against the piston member in which the cylinder 134 is formed by means of a seal ring 137$^1$.

The piston 133 is provided with a sliding seal within the cylinder 134 by means of a seal ring 138 mounted in a groove surrounding the piston. A bore 139 extends longitudinally through the plunger 128 from its lower end to the upper surface of the piston 133. The lateral area of the upper surface of piston 133 subject to this pressure is oppositely facing with respect to and is the same as the area of the lower end of the plunger 128 exposed to the pressure within the valve housing so that the plunger 128 is balanced insofar as the direct action of the pressure within the valve housing is concerned.

As in the previously described form, a control pressure from an external source is admitted to the housing 129 through a control pressure conduit 140 and passes into the circumferential channel 141 in the control piston in which the cylinder 134 is formed. This channel is wide enough so that this piston may move up and down without interrupting communication between the conduit 140 and the control pressure space 142.

The body 129 is externally threaded at 144 at its upper end to receive the sleeve 146 which provides a housing for the control springs and pistons as will presently be described. A cap 147 encloses the upper end of the sleeve 146 to complete the housing for the control springs and pistons.

Above the space 142 is the low remote pressure control plunger or piston 148 which has a sliding seal 149 about its exterior within the cylinder which forms a continuation upwardly of the space 142. It is subjected on its lower end surface to the pressure within the space 142 tending to urge it upwardly and its upward movement is limited by the split retaining ring 150 in the high body pressure control plunger 151. It is in this high body pressure control plunger 151 that the cylinders 134 and 142 are formed concentrically with each other but one above the other. This plunger 151 is slideably mounted within the housing 129 and its upward movement therein is limited by a downwardly facing shoulder 152 within the housing adjacent its lower end, this shoulder being engaged by a laterally extending flange with an upwardly facing surface which in effect forms a piston on the plunger 151.

The remote low pressure plunger 148 is constantly biased in a downward direction by means of a spring 153 bearing at its lower end upon the flange 154 and being held at its upper end by the adjusting nut 155 and the lock nut 156 threadedly engaged within the upper end portion of the body high pressure plunger 151.

The remote high pressure plunger 157 is provided with a seal ring 158 about its lower end portion and is adapted to abut against the upper end portion of the plunger 128 so that upon downward movement it will force the plunger 128 to propel the valve member 108 toward closing position.

Above its lower end the plunger 157 is provided with a laterally extending portion 159 forming a remote high pressure piston, and extending upwardly from this piston portion is a stem 160 of substantially the same outer diameter as the lower end portion of the plunger 157. This stem 160 extends upwardly through a bore in the remote low pressure plunger 148 and is provided with suitable threads on its upper end. The piston portion 159 is provided with suitable sliding seal ring 163 around its outer periphery where it engages within a cylinder formed within the body high pressure piston 151. A seal 164 is also provided around the stem portion 160 where it passes through the plunger 148 so as to permit this stem to slide with respect to the plunger 148 while maintaining such seal.

Surrounding that portion of the stem 160 which projects above the plunger 148 is a control spring 165 which is interposed between the upper end of the plunger 148 and the adjusting nut 166 and lock nut 167 threaded onto the upper end of the stem 160. Thus it will be seen that the spring 165 serves to constantly bias the plunger 157 in an upward direction with respect to the plunger 148.

The exterior of the body 129 adjacent its lower end is formed with a seating surface 169 and a groove to receive a seal member 170 in the same fashion as the lower portion of the body 29 in Fig. 2.

As above mentioned, the body high pressure piston or plunger 151 is slideably received within the body 129 and it is provided with sliding sealing engagement with said body by means of an upper seal ring 171 surrounding the plunger 151, a second sliding seal ring 172 surrounding this plunger just above the annular groove or channel 141 so as to prevent the escape of high pressure from the conduit 140 in an upward direction between the plunger 151 and the body 129. It is also provided with a similar seal 173 below the groove 141 to prevent the escape of such pressure downwardly between the body and the plunger as well as to prevent the upward passage of pressure fluid from below the seal ring 173. Finally there is a seal ring 174 around the lower laterally extending piston portion of the plunger 151 so as to provide a seal between said piston portion and the cylinder in which this piston portion operates. The bore 175 is provided from the lower end of the high pressure body piston 151 extending upwardly from an opening into the body of the valve into an opening just above the enlarged piston portion of the plunger 151 which abuts the shoulder 152. The area of this shoulder on the piston portion is calculated to exceed that of the lower end of the plunger 151 which is exposed to pressure within the valve body. Therefore pressure within the valve body will act in unbalanced fashion upon the plunger 151 tending to urge it downwardly. This action is opposed by the spring 176 which bears on the upper end 177 of the body 129 and at its opposite end is held by the adjusting nut 178 and lock nut 179 threaded into the upper end of the body high pressure plunger 151.

As will be seen, the pressure fluid from the conduit 140 reaches the remote pressure control cylinder 142 by means of the annular groove 141 in the plunger 151 and the radial passageway 180 which connects such annular groove with the remote pressure control space 142.

Disposed within the lower end portion of the cylinder in which the piston 159 is mounted is a spacer or sleeve 181 sealed within such cylinder by means of a seal ring 182 around its outer periphery and held in place by means of a split retaining ring 183 carried by the wall of the cylinder just above the sleeve 181. This sleeve thus provides in effect a portion of the plunger 151 and provides a division between the cylinder in which the piston 159 is mounted and the cylinder in which the piston 133 is mounted.

As heretofore explained, the upper portion of the control mechanism body is at all times subjected to some basic pressure such as atmospheric pressure which for purposes of control is substantially constant. This space is connected by a bore 184 in the plunger 157 with the space 185 just below the piston 159 on the plunger 157. Thus the pressure acting on the piston 159 tending to urge it upwardly is a more or less constant atmospheric pressure while that tending to urge it downwardly will be the remote control pressure entering through the conduit 140.

Extending from the space 185 downwardly through the plunger 151 is a passageway 186 connecting the space 185 to the space 187 below the piston on the plunger 151 so that this space at 187 will also be under atmospheric or other substantially constant pressure. Also, a passageway 188 is formed through that portion of the plunger 151 which lies between the space 187 and the cylinder 134 in the interior of the plunger 151 and below the piston 133, so that the space within the cylinder 134 below the piston 133 will likewise be under atmospheric or like pressure.

In operation, in the structure illustrated in Fig. 3, the effect on the plunger 128 of the pressure fluid within the valve housing is balanced by the areas on the lower end of this plunger and the oppositely facing surface above the piston 133 being of equal area and both subjected to this pressure. The pressure on the upper end of the plunger 128 is only that applied by the plunger 157. A portion of the pressure applied by the plunger 157 to the plunger 128 is due to the atmospheric pressure on the upper end of the stem 160. The area of the upper end of the stem 160 being substantially equal to the area of the fourth or lower surface of the piston 133 and the lower surface of this piston likewise being subjected to atmospheric pressure, the effect of atmospheric pressure on the plunger 128 is thus balanced. This portion of the force on the upper end of the plunger 128, being thus balanced, is a nonactuating force.

Each of the other pistons in the control system is urged in one direction by control pressure and is biased in the opposite direction by reaction of a spring plus atmospheric pressure. Thus, the remote high pressure piston 159 is urged downwardly by the control pressure entering through the conduit 140 and is biased in the opposite direction by the spring 165 and atmospheric pressure within the space 185. Likewise, the plunger 148 is urged upwardly by the remote control pressure entering through the conduit 140 and this action is opposed by the biasing spring 153 and by the action of atmospheric pressure on the upper end of this plunger 148. Finally, the plunger 151 is urged downwardly by the differential of total pressure on the lower end of this plunger by the control pressure within the body of the valve, and the same pressure acting upon the shoulder 152 which is of greater area than the bottom end of the plunger. This tends to urge this plunger downwardly and this movement is opposed by the spring 176 and by the action of atmospheric pressure within the space 187.

In operation, the structure shown in Fig. 3 will tend to close the valve when the pressure within the valve body becomes so great that the differential of forces exerted on the plunger 151 by this pressure acting on the lower end of the plunger and on the shoulder 152 is sufficient to overcome the action of the spring 176 and of atmospheric pressure within the space 187. This will provide an actuating force on plunger 128, which, when great enough, will move the valve member 108 from its retained position and cause the closing of the valve. If, on the other hand, the actuating force causing the valve closing is caused by a variation in the remote pressure entering through the conduit 140, this will take place either when this pressure rises to such a value that its force exerted on the piston 159 is sufficient to overcome the spring 165 and the action of atmospheric pressure in the space 185 and move this piston downwardly, or it will occur when this control pressure drops to such a point that it no longer holds the force of the spring 153 and this spring urges this plunger downwardly taking with it the plunger 157 and applying an actuating force to the plunger 128 to cause the closing of the valve.

Coming now to Fig. 4, the structure is identical with that shown in Fig. 3 in all respects except for the means for holding the stationary end of the spring 153 and the difference in mounting and action of the pistons 151 and 251 and the springs acting thereon. The other parts will not be again described.

Turning to these parts more specifically, it will be seen that the plunger 251 does not have a passageway corresponding to the passageway 175 for communicating pressure from within the valve body to the shoulder 252. Instead, this shoulder 252 merely acts as a stop against upward movement of the plunger 251 and pressure within the valve body is unbalanced in its action upon the lower end of this plunger.

On its upper end the plunger 251, instead of having the upwardly extending sleeve which is on the upper end of the plunger 151, merely has a sliding ring or nut 288 rigidly mounted thereon to provide a slide within the housing 146 and to provide an abutment for the lower end of the spring 276. The upper end of this spring 276 is anchored to the housing by means of the adjusting nut 278 and the anchor nut or locking nut 279.

Thus, pressure within the valve housing is constantly urging this plunger 251 upwardly while the spring 276 is constantly biasing it in a downward direction. It will be readily apparent that when the pressure within the valve housing drops to less than a predetermined minimum it will fail to hold the force applied by the spring 276 and this spring will provide an actuating force to force the plunger 251 downwardly toward the space within the valve housing. As before, this plunger is provided with a split retaining ring 150 which engages the upper end of the plunger 148 and the plunger 148 engages the upper end of the piston 159 so that when the plunger 251 moves downwardly as just described it will carry with it the other plungers and also the plunger 128 to dislodge the valve member 108 from its position and cause it to move into valve closing position.

The spring 153 acts for the same purpose and in the same manner as in Fig. 3 but instead of being anchored by nuts threaded into the sleeve on the upper end of the plunger 151 it is anchored by a nut 255 adjustably threaded into the threaded interior of the housing 146 above the nuts 278 and 279, and is locked in place by means of a lock nut 256.

Thus it will be seen that whereas Fig. 3 shows a structure in which the valve will be closed when the remote control pressure entering through the conduit 140 either exceeds or falls below a predetermined pressure range, or when the pressure within the valve housing exceeds a predetermined maximum, the mechanism illustrated in Fig. 4 will cause the closing of the valve likewise when the remote pressure entering through the conduit 140 either exceeds or falls belows the predetermined range, but will close when the pressure within the valve housing falls below a predetermined minimum.

Reference is now had to Fig. 5 in which, although many of the parts operate in substantially the same way to perform substantially the same result as corresponding parts in Figs. 3 and 4, there are differences in form and location, and some of the parts are different in function so as to provide a somewhat different result in certain respects from other results provided in Figs. 3 and 4.

Inasmuch as the housing members provided in Figs. 5 and 6 are substantially the same as those provided in Fig. 3, no further description thereof will be made. The same is true of the valve member and the retaining means therefor in the lower portions of these figures, and of all of the other parts bearing numbers within the one hundred series. These will be mentioned only insofar as they cooperate with the other parts which will be described more in detail.

In place of and serving substantially the same function as the body high pressure plunger 151 of Fig. 3 is a body high pressure plunger 351 in Figs. 5 and 6. It differs only slightly in proportions from the plunger 151 but differs in construction somewhat in that instead of an integral upwardly extending sleeve threaded both inside and outside at its upper end, the plunger 351 has a sleeve formed separately and of somewhat larger external diameter than the main body of the plunger, this sleeve being threaded onto the upper end of the plunger. However, it is threaded both internally and externally at its upper end for the same purpose as the integral sleeve of Fig. 3. It is made separately for convenience in manufacture and to make possible the assembly of the device with this sleeve which is designated at 351¹ of larger diameter than would otherwise be possible. The purpose of making it of larger diameter is to permit the use of different type of plungers inside the sleeve, which plungers require more room than in the form shown in Fig. 3.

This plunger 351 is provided with seals 171 and 173, respectively, above and below the passageway provided by the groove 141 so that high pressure fluid entering through the conduit 140 will not be permitted to escape upwardly or downwardly between the body and the plunger 351.

Plunger 351 is exposed at its lower end over a substantial area to the interior of the valve body but has an area underlying the shoulder 152 of the body which is greater than the area exposed to the interior of the valve body. For this reason, pressure within the valve body will exert a greater downward force on the area below the shoulder 152, to which it has access through the passageway 175 in the plunger 351, than it will exert upwardly on the lower end of this plunger. The greater the pressure within the valve body, the greater is the force exerted by such pressure in a direction tending to move the plunger 351 downwardly.

On the other hand, the plunger 351 is biased in an upward direction by means of the spring 176 which functions in the same manner as the spring of the same number in Fig. 3.

Adjacent its lower end the plunger 351 is provided with a relatively small bore providing for passage of the plunger 328 which corresponds in function to the plunger 128 of Fig. 3. The lower end of this plunger 328 is sealed within this passageway by means of a seal ring 136 which permits the plunger 328 to reciprocate up and down. Likewise, the plunger is provided with a sliding seal 132 adjacent its upper end for the purpose of sealing the plunger within the bore into which it fits as will presently be described. Intermediate its ends this plunger is formed with a laterally extending concentric portion providing a piston-like part 333. The laterally extending part of this piston 333 is of substantially the same area as the lower and upper ends of the plunger 328 and inasmuch as the lower end is connected with the space above this piston by a bore 328, the pressure from within the valve body will be equalized on the plunger 328 and will not tend to move it either upwardly or downwardly. The piston 333 is located partly within a cylindrical opening 334 provided by a counterbore in the lower portion of the plunger 351 so that it may slide upwardly and downwardly therein, and is provided with a sliding seal 338 against the wall of such cylinder.

The upper portion of the plunger 351 is formed with an enlarged cylindrical bore as illustrated for the purpose of receiving a body low pressure plunger 348 which is slideable in such cylindrical bore. It has a circumferential groove 391 therein intermediate its ends, this groove being in communication with the conduit 140 through a radial opening 380 in the plunger 351. Suitable sliding seals 349 and 349¹ are provided above and below the groove 391 so as to prevent the escape of pressure fluid upwardly or downwardly between the plungers 351 and 348. The interior of the lower end portion of the plunger 348 is provided with a relatively small bore to slidingly receive the upper end portion of the plunger 328 and form a sliding seal therewith by means of the seal ring 132. The upper portion of the plunger 348 is provided with a much larger bore in the form of a cylindrical counterbore 342 adapted to receive the remote low pressure plunger 359 which is sealed in its cylinder 342 by a suitable seal ring 363. It is also sealed within the small bore of the lower end of the plunger 348 by means of a seal ring 158. The groove 391 is connected to the cylindrical opening 342 by means of a radial passageway 390 so that remotely originating control pressure fluid may enter through the conduit 140 and obtain access to the interior of the space 342 below the plunger 359.

Upward travel of the plunger 348 with respect to the plunger 351 is limited by engagement of the flange 354 with the split retainer ring 150 mounted in the upstanding sleeve portion 351¹. The plunger 348 is constantly biased in a downward direction by means of a spring 153 which bears against the flange 354 in a downward direction and is held down from above by means of an adjusting nut 155 and anchor nut 156 threaded into the upper end of the sleeve 351¹.

The upward travel of the plunger 359 is limited by a similar split retainer ring 392 mounted in the upper portion of the plunger 348 and adapted to be abutted by the upper end of the plunger 359. The plunger 359 is constantly biased in a downward direction by means of a spring 365 which bears on the upper end of the plunger and is limited in its upward travel by means of an adjusting nut 393 locked in place by a lock nut 394, both threaded into the upper end of the upwardly extending sleeve-like portion of the plunger 348.

In order to balance the effect of atmospheric pressure existing in the upper portion of the control mechanism housing, the plunger 359 is provided with a passageway 384 extending longitudinally thereof from its upper end to its lower end and the plunger 328 is provided with a passageway 343 longitudinally thereof extending from its upper end and opening into the space just below the piston 333. Thereby atmospheric pressure from within the upper portion of the housing will be allowed to pass downwardly through the plungers 359 and 328 into the space 334 below the piston 333. Inasmuch as the exposed area of the piston 333 is substantially equal to the cross-sectional area of the smaller portion of the plunger 328, the existence of atmospheric pressure in the space 334 will substantially offset the effect of atmospheric pressure on an area at the upper end of the plunger 359 which is equal in area to the upper end portion of the plunger 328.

The lower end portion of the plunger 351 is also provided with a radially extending passageway 388 connecting the space 334 below the piston 333 with the space 387 below the piston on the plunger 351. This provides a substantially constant atmospheric pressure on the under side of this piston and provides a passageway through which the atmosphere therein may be bled off when pressure conditions are such that the plunger 351 tends to move downwardly.

In operation, in the form shown in Fig. 5, the plunger 351 is acted upon by the pressure within the valve housing with the resultant force tending to move the plunger downwardly, this force being greater as the pressure within the valve housing increases. Such downward movement is opposed by the bias provided by the spring 176 and the atmospheric pressure within the space 387 both of which tend to urge this piston upwardly. Hence, when the pressure within the valve housing becomes greater than a predetermined value it will provide an actuating force to move the plunger 351 downwardly in a direction to force the valve member 108 out of its retainer and into valve closing position.

Pressure fluid from within the valve housing also passes upwardly through the passageway 339 and into the space surrounding the piston 333 below the plunger 348. This pressure acts on the lower end of the plunger 348 tending to force it upwardly and this tendency is opposed by the spring 153 which provides a downward bias, together with the effect of atmospheric pressure within the upper portion of the housing which likewise provides a downward bias. Obviously, when the pressure within the valve housing falls to less than sufficient to overcome the force of the spring 153, this spring will provide an actuating force to force the plunger 348 downwardly, causing it to act through plunger 359 to force the plunger 328 downwardly, thereby disengaging the valve member 108 from its retainer and causing it to close the valve.

Control pressure from a remote source introduced through the conduit 140 and passing in the manner heretofore described into the space 342 will act upwardly upon the plunger 359 and this force will be opposed by the action of the spring 365 on the upper end of this plunger and also by the atmospheric pressure on the upper end of the plunger. It will be recalled that that portion of the force provided by atmospheric pressure on an area equal to the area of the upper end of the plunger 328 will be balanced off by the introduction of atmospheric pressure through the passageways 384 and 343 into the space below the piston 333, and will thus provide a non-actuating force, but atmospheric pressure on the remainder of the area of the top of the plunger 359 provides a bias on this piston in a downward direction in addition to that provided by the spring 365. Obviously, when the pressure in the conduit 140 drops to such a degree that it provides a force insufficient in the space 342 to overcome the spring 365 and the influence of atmospheric pressure, the plunger 359 will move downwardly exerting an actuating force driving the plunger 328 downwardly and causing the closing of the valve. Since the pressure in space 342 acts only between opposed parts of plungers 348 and 359 it only tends to move one with respect to the other. The plunger 348 is shown in its lowermost position with respect to the plunger 359 due to the presence of the retaining ring 392, so pressure in the space 342 cannot result in moving it downwardly. The plunger 348 is also shown in its uppermost position with respect to the valve housing due to the presence of the retaining ring 150 so that it cannot move upwardly and reduction of pressure in the space 342 can only result in moving the plunger 359 downwardly with respect to the plunger 348.

Turning now to the form illustrated in Fig. 6, all the parts are very nearly identical to those described in connection with Fig. 5 with the exception that the plunger 348 is of slightly different form, the upwardly extending sleeve-like portion at its upper end having been eliminated and the plunger 459 having been substituted for the plunger 359.

The cylindrical opening within the upper portion of the plunger 448 is made somewhat smaller and extended somewhat lower than the cylinder 342 in Fig. 5, this cylinder being indicated as 485 in Fig. 6, so as to receive the piston 459. The passageway 490 communicates between the groove 391 and the space above the piston 459. A seal is provided about the piston 459 by means of a seal ring 463.

The upper end portion of the plunger 448 is counterbored to receive a cylinder head member 495 held in place by a split retainer ring 496 carried by the upper end of the plunger 448. Since pressure in the space 442 acts upwardly only on the cylinder head 495 of the plunger 448 and the latter is shown in its uppermost position with respect to the valve housing due to the presence of the retaining ring 150, pressure in the space 442 cannot move the plunger 448 or its cylinder head upwardly and can only move the piston 459 downwardly. The plunger 459 has an upwardly extending stem 460 which projects through the cylinder head 495 and is sealed therein by means of a seal ring 464. The upwardly projecting end of this stem is surrounded by a spring 165 which is held downwardly on the stem by means of an adjusting nut 166 and lock nut 167.

Communication from the upper portion of the housing to provide atmospheric pressure in spaces where desired is provided by means of a longitudinal bore 484 from that portion of the stem which is in the upper part of the housing downwardly to the lower end of the plunger 459. A lateral bore into the space 485 is provided so as to provide atmospheric pressure in such space. As before this passageway communicates with the passageway 343 in the plunger 328 to provide atmospheric pressure in the space 334 and through the passageway 388 to provide atmospheric pressure in the space 387.

In operation the plunger 351 acts in the same fashion as the plunger bearing that number in Fig. 5 and the plunger 448 acts in the same fashion as the plunger bearing the number 348 in Fig. 5. However, remote control pressure admitted through the conduit 140 and hence into the space 442 acts downwardly on the upper end of the piston 459. When this control pressure becomes great enough to overcome the force exerted by the spring 165 in an upward direction on this plunger, the plunger will move downwardly and provide an actuating force to force the plunger 328 downwardly to carry the valve member 108 to valve closing position. Since pressure in the space 442 acts upwardly only on the cylinder head 495 of the plunger 448 and the latter is shown in its uppermost position with respect to the valve housing, pressure in the space 442 cannot move the plunger 448 or its cylinder head upwardly and can only move the piston 459 downwardly.

It will be appreciated that by alterations of dimensions and shapes additional pistons could be provided if required for the purpose of providing additional controls concentric with the plungers illustrated so as to retain the characteristics of ease of manufacture and smoothness of operation inherent in the present structure.

It will further be appreciated that a means has been provided for carrying out and accomplishing all of the objects and advantages sought by this invention.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an automatic shut-off valve having a body with a flow passage therethrough and a valve seat surrounding said passage and a space therein laterally of the flow passage and outside the direct flow path, and a valve member disposed in said space when the valve is open and movable therefrom into said direct flow path, said valve member being conformed to said valve seat to seat thereon and obstruct flow through the valve when moved into said direct flow path, the combination therewith of a plunger having one end movable into said space to move said member therefrom toward said flow path and having said one end exposed to the pressure of fluid existing in said space to urge it out of said space, having an oppositely facing surface of an area substantially equal to that of said one end and means for applying to said oppositely facing surface the pressure of fluid in said space to balance the effect of such pressure on said plunger, and said plunger having a second oppositely facing surface, means sealing off second oppositely facing surface from exposure to said pressure, and means for applying an actuating force to said second oppositely facing surface in substantial balance about the axis of said plunger and in a direction to move said plunger into said space.

2. The invention set forth in claim 1, in which said means for applying an actuating force to said second oppositely facing surface comprises a second plunger substantially concentric with said first plunger and bearing thereagainst to apply an actuating force to said first plunger in a direction to move said first plunger into said space.

3. The invention set forth in claim 1, in which said means for applying an actuating force is independent of the pressure of fluid in said space.

4. In an automatic shut-off valve having a body with a flow passage therethrough and a valve seat surrounding said passage and a space laterally of the flow passage and outside the direct flow path, and a valve member disposed in said space when the valve is open and movable therefrom into said direct flow path, said valve member being conformed to said valve seat to seat thereon and obstruct flow through the valve when moved into said direct flow path, the combination therewith of a plunger having one end movable into said space to move said member therefrom toward said flow path and having said one end exposed to the pressure of fluid existing in said space to urge it out of said space, having an oppositely facing surface of an area substantially equal to that of said one end and means for applying to said oppositely facing surface the pressure of fluid in said space to balance the effect of such pressure on said plunger, having another oppositely facing surface, and having a fourth surface facing in the same direction as said one end and equal in area to said other oppositely facing surface, means sealing off said other oppositely facing surface and said fourth surface from exposure to the pressure in said space, means for applying a variable force to said other oppositely facing surface in substantial balance about the axis of said plunger in a direction to move said plunger into said space, said last means including a member having a surface at least equal in area to the area of said other oppositely facing surface and so disposed that fluid pressure thereon will exert its force on said other oppositely facing surface, and means for connecting said surface of said member with said fourth surface of said plunger, whereby the fluid pressure on said fourth surface will be balanced by the same fluid pressure on an area equal to that of said other oppositely facing surface.

5. The combination set forth in claim 1, in which the last mentioned means comprises a plurality of alternatively operable plungers, means for applying a control pressure to each of said alternatively operable plungers tending to move at least one of said plungers in one axial direction, and means biasing each of said alternatively operable plungers in a direction opposed to the control pressure to which it is exposed.

6. The combination set forth in claim 1, in which the last mentioned means comprises a pair of alternatively operable plungers means for applying to one of said pair a control pressure tending to urge said one of said pair axially toward said first plunger and means for applying to the other of said pair a control pressure tending to urge said other of said pair axially away from said first plunger, and means biasing each of said alternatively operable plungers in a direction opposed to the control pressure to which it is exposed.

7. The combination set forth in claim 1, in which the last mentioned means comprises more than two alternatively operable plungers means for applying a control pressure to each of said alternatively operable plungers tending to move each of said alternatively operable plungers in one axial direction and means biasing each of said alternatively operable plungers in a direction opposed to the control pressure to which it is exposed.

8. The combination set forth in claim 1, in which the last mentioned means comprises more than two alternatively operable plungers means for applying a control pressure to each of said alternatively operable plungers tending to move each of said alternatively operable plungers in one axial direction, and means biasing each of said alternatively operable plungers in a direction opposed to the control pressure to which it is exposed, all of the said plungers being concentric with each other.

9. The combination set forth in claim 1, in which the last mentioned means comprises more than two alternatively operable plungers means for applying one control pressure to each of two of said alternatively operable plungers, said pressure tending to move said two plungers axially in opposite directions, and means for applying to another of said alternatively operable plungers a different control pressure tending to move said other alternatively operable plunger in one of said directions, and means biasing each of said alternatively operable plungers in a direction opposed to the control pressure to which it is exposed.

10. The combination set forth in claim 1, in which the last mentioned means comprises more than two alternatively operable plungers means for applying a control pressure to each of two of said alternatively operable plungers, said pressure tending to move one of said two plungers axially toward and the other axially away from said first mentioned plunger, and means for applying to another of said alternatively operable plungers a control pressure tending to urge it axially toward said first plunger, and means biasing each of said alternatively operable plungers in a direction opposed to the perssure to which it is exposed.

11. The combination set forth in claim 1, in which the last mentioned means comprises more than two alternatively operable plungers means for applying a control pressure to each of two of said alternatively operable plungers, said pressure tending to move one of said two plungers axially away from and the other axially toward said first mentioned plunger and means for applying to another of said alternatively operable plungers a control pressure tending to urge it axially away from said first plunger, and means biasing each of said alternatively operable plungers in a direction opposed to the pressure to which it is exposed.

12. The combination set forth in claim 1, in which the last mentioned means comprises more than two alternatively operable plungers, means for applying a control pressure to each of two of said alternatively operable plungers from a source external of said body, said pressure tending to move said two plungers in opposite axial directions, and means for applying to another of said alternatively operable plungers a control pressure from within said body tending to move it in one of said directions, and means biasing each of said alternatively operable plungers in a direction opposed to the pressure to which it is exposed.

13. The combination set forth in claim 1, in which the last mentioned means comprises more than two alternatively operable plungers, means for applying a control pressure to each of two of said alternatively operable plungers from within said body, said pressure tending to move said two plungers in opposite axial directions, and means for applying to another of said alternatively operable plungers a control pressure from a source external of said body tending to move it in one of said directions, and means biasing each of said alternatively operable plungers in a direction opposed to the pressure to which it is exposed.

14. The combination set forth in claim 1, in which the last mentioned means comprises more than two alternatively operable plungers, means for applying a control pressure to each of two of said alternatively operable plungers from a source external of said body, said pressure tending to move one of said two plungers axially away from and the other toward said first mentioned plunger, and means for applying to another of said alternatively operable plungers a control pressure from within said body tending to urge it axially away from said first plunger, and means biasing each of said alternatively operable plungers in a direction opposed to the pressure to which it is exposed.

15. The combination set forth in claim 1, in which the last mentioned means comprises more than two alternatively operable plungers, means for applying a control pressure to each of two of said alternatively operable plungers from a source external of said body, said pressure tending to move one of said two plungers axially away from and the other axially toward said first mentioned plunger, and means for applying to another of said alternatively operable plungers a control pressure from within said body tending to urge it axially toward said first plunger, and means biasing each of said alternatively operable plungers in a direction opposed to the pressure to which it is exposed.

16. The combination set forth in claim 1, in which the last mentioned means comprises more than two alternatively operable plungers, means for applying a control pressure to each of two of said alternatively operable plungers from within said body, said pressure tending to move one of said two plungers axially away from and the other axially toward said first mentioned plunger, and means for applying to another of said alternatively operable plungers a control pressure from a source external of said body tending to urge it axially away from said first plunger, and means biasing each of said alternatively operable plungers in a direction opposed to the pressure to which it is exposed.

17. The combination set forth in claim 1, in which the last mentioned means comprises more than two alternatively operable plungers, means for applying a control pressure to each of two of said alternatively operable plungers from within said body, said pressure tending to move one of said two plungers axially away from and the other axially toward said first mentioned plunger, and means for applying to another of said alternatively operable plungers a control pressure from a source external of said body tending to urge it axially toward said first plunger, and means biasing each of said alternatively operable plungers in a direction opposed to the pressure to which it is exposed.

References Cited in the file of this patent

UNITED STATES PATENTS

| | | |
|---|---|---|
| 2,635,626 | Meynig | Apr. 21, 1953 |
| 2,667,890 | Meynig | Feb. 2, 1954 |